United States Patent [19]

Chan

[11] E Patent Number: Re. 32,558

[45] Reissued Date of Patent: Dec. 15, 1987

[54] AUTOREWINDING SELF-THREADING CAMERA

[75] Inventor: Kwok Y. Chan, North Point, Hong Kong

[73] Assignee: Eastman Kodak Company, Rochester, N.Y.

[21] Appl. No.: 801,133

[22] Filed: Nov. 22, 1985

Related U.S. Patent Documents

Reissue of:

[64] Patent No.: 4,416,525
Issued: Nov. 22, 1983
Appl. No.: 282,722
Filed: Jul. 13, 1981

[51] Int. Cl.[4] ..... G03B 1/18;17/42

[52] U.S. Cl. ..... 354/173.1; 354/206; 354/214

[58] Field of Search ..... 354/171, 173.1, 173.11, 354/204–206, 212–214; 242/71, 71.1, 71.2, 71.4, 71.5, 71.6, 191; 352/124, 158

[56] References Cited

U.S. PATENT DOCUMENTS

| | | | |
|---|---|---|---|
| 2,969,722 | 1/1961 | Schwartz | 354/173.1 |
| 3,126,805 | 3/1964 | Schroder et al. | 242/71.6 |
| 3,377,935 | 4/1968 | Furusawa | 352/158 X |
| 3,383,068 | 5/1968 | Winkler et al. | 242/71.1 |
| 3,463,071 | 8/1969 | Winkler et al. | 354/212 |
| 3,598,033 | 8/1971 | Sasaki | 354/214 |
| 3,946,409 | 3/1976 | Toyoda | 354/173.11 |
| 4,145,011 | 3/1979 | Date | 354/214 X |
| 4,162,837 | 7/1979 | Haragushi | 354/173.1 |
| 4,229,091 | 10/1980 | Date et al. | 354/214 X |
| 4,239,166 | 12/1980 | Daitoku | 242/71.6 |
| 4,397,535 | 8/1983 | Harvey | 354/173.1 X |

FOREIGN PATENT DOCUMENTS

| | | | |
|---|---|---|---|
| 2151370 | 10/1915 | Fed. Rep. of Germany | 352/124 |
| 1117997 | 11/1961 | Fed. Rep. of Germany . | |
| 2739948 | 3/1978 | Fed. Rep. of Germany . | |
| 3201609 | 8/1982 | Fed. Rep. of Germany . | |
| 118119 | 10/1978 | Japan . | |
| 245882 | 1/1926 | United Kingdom . | |
| 1017304 | 1/1966 | United Kingdom . | |
| 1216572 | 12/1970 | United Kingdom . | |
| 2027915A | 3/1978 | United Kingdom . | |
| 2039066A | 7/1980 | United Kingdom . | |
| 2052769A | 1/1981 | United Kingdom . | |
| 2084341A | 4/1982 | United Kingdom . | |

*Primary Examiner*—W. B. Perkey
*Attorney, Agent, or Firm*—Russell E. Hattis; Stephen R. Arnold

[57] ABSTRACT

An electrically driven automatic film advance camera with automatic transition to rewind without external actuation is described. Film advance after each exposure occurs automatically after release of the shutter actuating button by means of an integral electric drive motor preferably contained within the film take-up spool. The end of film condition during film advance is signalled by a sudden onset in film tension, which actuates a switching system to reverse motor drive polarity and power the motor until the film is completely rewound into the cassette, whereupon motor actuation ceases. A take-up spool gear drive train remains fully engaged at all times. During the rewind operation both the take-up spool and the drive spool are driven simultaneously by the drive motor to facilitate film disengagement. A film engaging sprocket serves to govern film advance for framing purposes, the sprocket being principally in an idling state throughout the film advance operation. An auto-loading feature is provided in the form of an engaging hook on the film take-up spool, whereby during the loading operation the film advance mechanism actuated once to cause film capture by the take-up spool. Threading of the take-up spool is thereby totally eliminated. A transitional propulsive assist to the film capture operation is provided. A large take-up spool is employed, and the drive motor placed therein, resulting in a significant saving of space.

53 Claims, 28 Drawing Figures

FIG. 1A
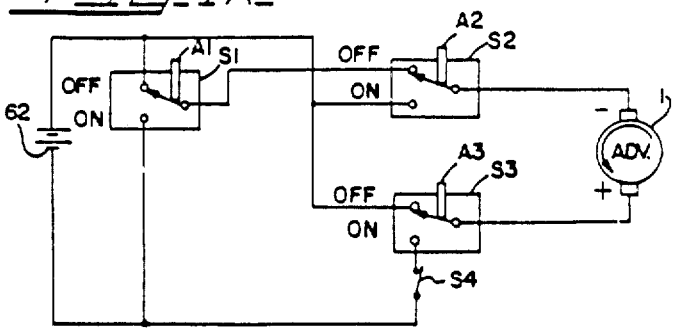
FIG. 1B
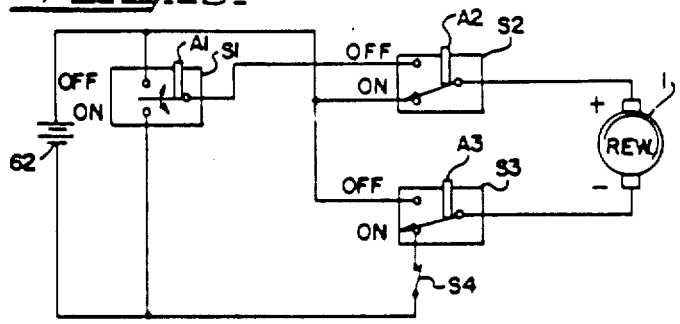
FIG. 1C
SWITCHING LOGIC TRUTH TABLE — S4 CLOSED
| S1 | S2 | S3 | STATE |
|---|---|---|---|
| X | ON | ON | REWIND |
| OFF | OFF | ON | REWIND |
| ON | OFF | OFF | ADVANCE |

FIG. 3B
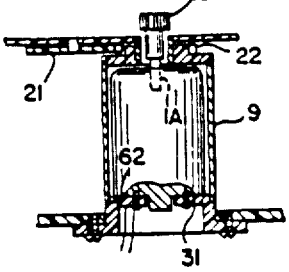
FIG. 4
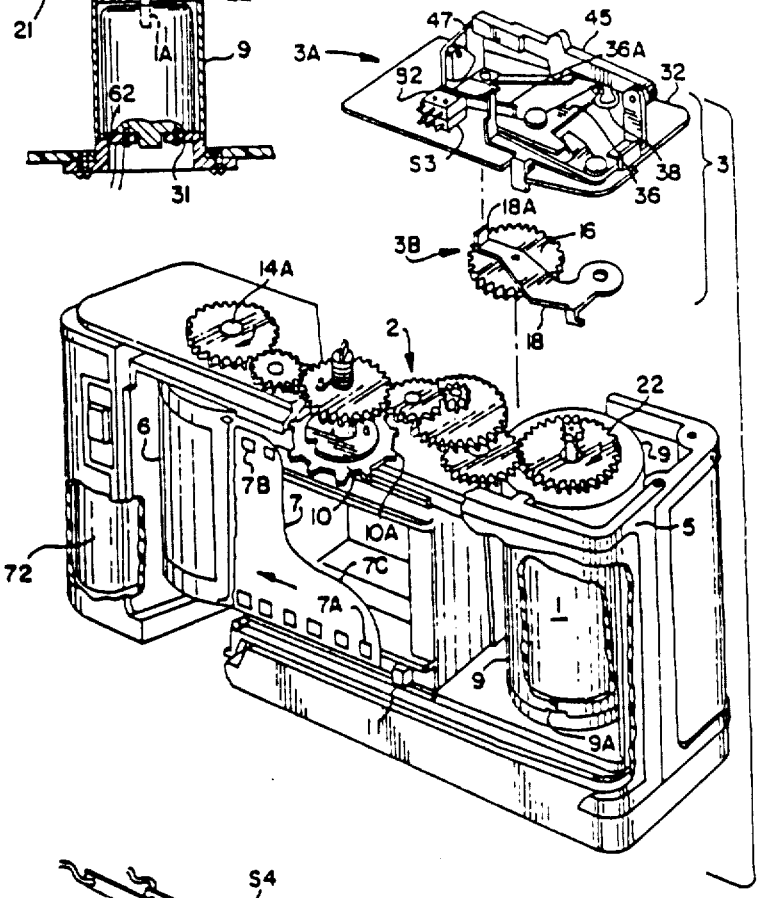
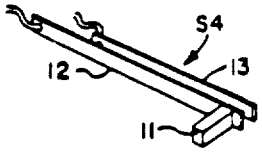
FIG. 4A

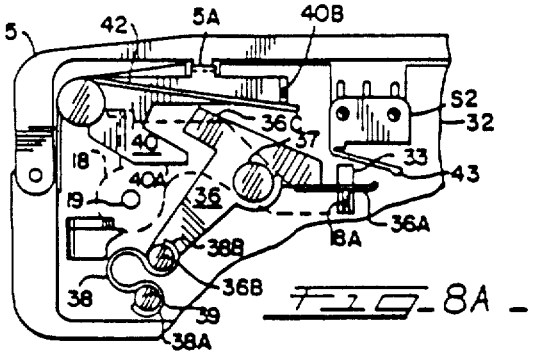
FIG. 8A
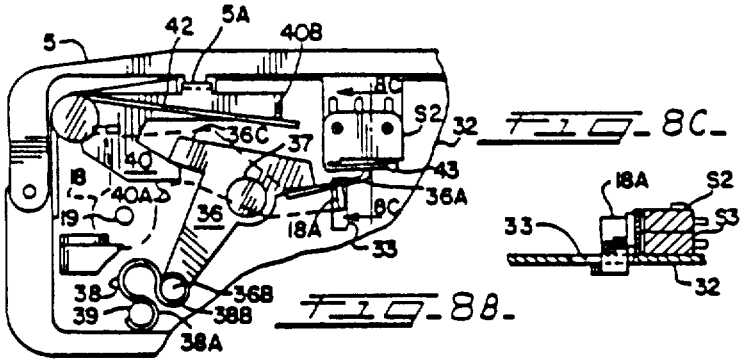
FIG. 8C
FIG. 8B
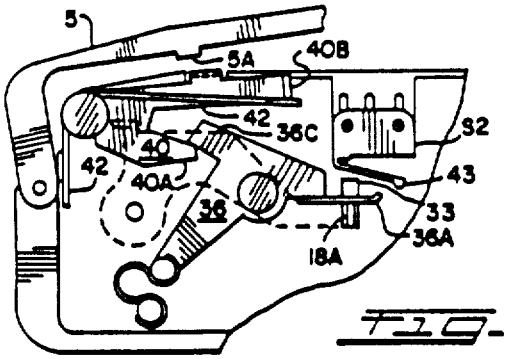
FIG. 12

FIG. 10A
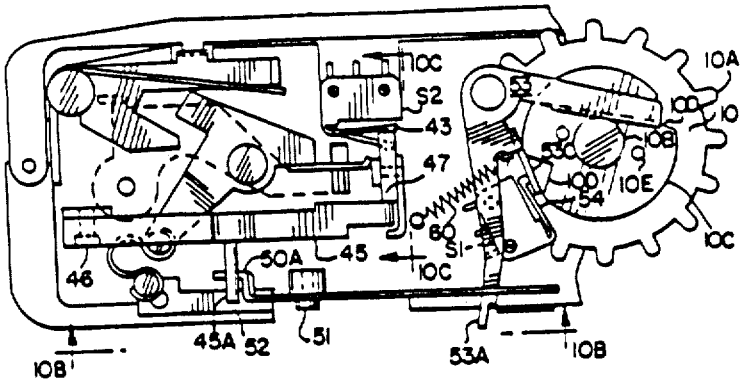
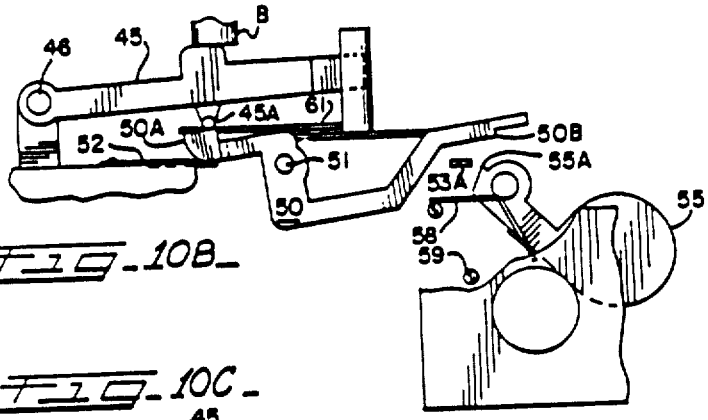
FIG. 10B
FIG. 10C
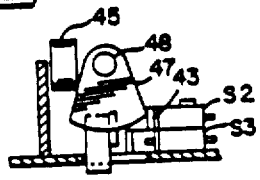

FIG. 11A
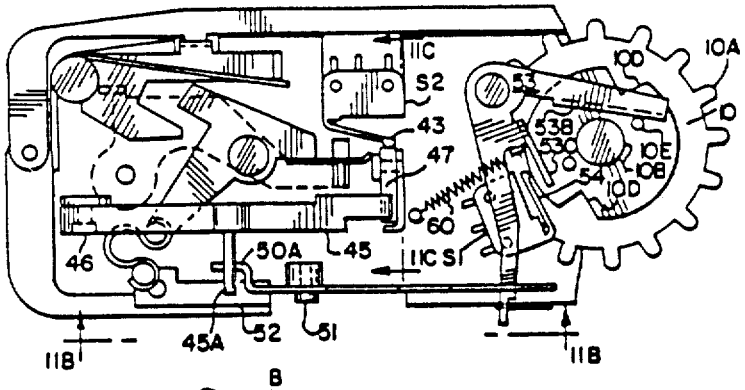
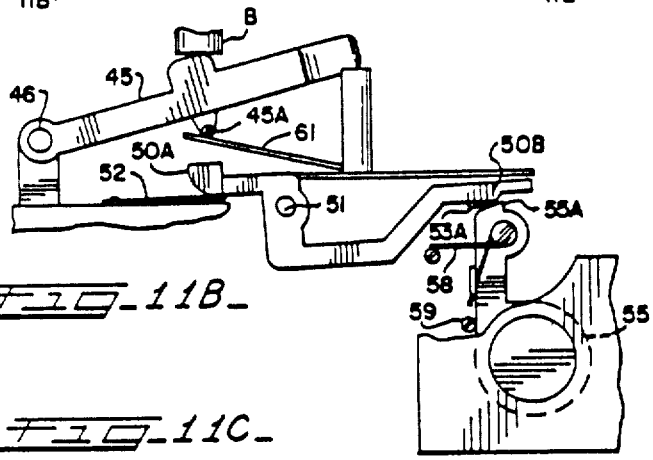
FIG. 11B
FIG. 11C
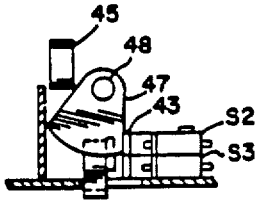

AUTOREWINDING SELF-THREADING CAMERA

Matter enclosed in heavy brackets [ ] appears in the original patent but forms no part of this reissue specification; matter printed in italics indicates the additions made by reissue.

TECHNICAL FIELD

The present invention relates to improvements in the camera art, and relates particularly to an automatic rewind feature for an electrically-driven film advance camera and for automatic film capture feature for the take-up spool to facilitate the film loading operation.

BACKGROUND OF THE PRIOR ART

Automatic film advance mechanisms for still cameras are long known in the art, and typically employ some form of film propulsion means either integral with or connectable to the camera body and actuated in cooperation with the shutter release mechanism to advance in cooperation with the shutter release mechanism to advance the film automatically one frame after each exposure. Contemporary automatic film advance systems of this type are almost exclusively of the electric motor type. When the film supply is exhausted, the user must be appraised of the end of film condition either by suitable warning means, or alternatively by refusal of the film actuating mechanism to advance after a subsequent exposure. At this point the operator must make a deliberate reconfiguration of the camera by manual operation of some means to initiate rewind of the film. More recent developments in the camera art have simplified this to the state that merely a switch need be actuated by the operator to throw the film advance mechanism into a rewind configuration, whereupon the film is rewound into the cassette, and film rewind is automatically terminated. Such a manual actuation feature poses an inconvenience to the user, and typically necessitates incorporation of extra components into the camera to secure the requisite switching. Such switching typically involves either singly or in combination a change in mechanical linkage or actuation of an electrical switch directly. Accordingly, it is the object of this invention to provide an automatic rewind feature for an electrically-driven camera wherein the transition from film advancing mode to film rewinding mode is carried automatically without requiring a special manual operation by the operator. This operation should be carried out reliably, irrespective of film length, and therefore should require no special programming of the camera to return to the rewind configuration after a specified number of frames.

During the loading operation of conventional still cameras employing cassette type film dispensers it is generally necessary to thread the film to a takeup spool to provide adequate film engagement for film advance. Conventional cameras so threaded do not derive the principal propulsive power applied to the film from the take-up reel, but rather derive such power from an auxiliary drive sprocket integrally geared to the takeup reel, such that the drive sprocket supplied the motor power to the film, and the take-up spool is overdriven through a slip clutch so as to accept the film in a tight wrap during film advance. Thus, the film must be threaded at the beginning to insure proper disposition of film wrap about the take-up spool during the film advance operation. This threading process is typically time consuming, and frequently results in lost time to the user when he must change film rapidly, as for example in news coverage, sport coverage, and similar situations in which the photographer takes a great many pictures in rapid succession. Accordingly, it is the object of this invention to provide a film loading system wherein no such threading is necessary into the take-up spool and wherein the film may simply be loaded by inserting the cassette, pulling out an adequate amount of leader, and closing the film loading door.

BRIEF SUMMARY OF THE INVENTION

One basic feature of the present invention relates to an automatic rewind system for a camera employing electric motor film advance, and wherein film is rewound automatically after the last exposure, irrespective of film length. The present disclosure describes as an exemplary form of this invention a 35 mm still camera which incorporates an electric motor for automatic film transport. After each exposure, the film is advanced one frame by the motor for the next exposure. The end of film condition is signaled by a sudden rise in tension of the film as the take-up spool attempts to withdraw the remainder of the film from the cassette, but is prevented from doing so because the remaining film end is firmly anchored to the dispensing spool. A tension-sensing mechanism in the camera responds to this increase in tension to actuate and latch motor drive switches to a continuously energized reverse drive configuration, whereupon the motor drive proceeds to rewind the film into the cassette. Thus, no special operations need be taken by the operator to configure the camera to a rewinding state.

According to a specific aspect of the rewind feature of the invention, the film tension sensing that triggers the rewind operation is derived from gear thrust in gear train connecting the motor to the take-up spool. When the film is completely payed out and the take-up spool can no longer rotate, a thrust is propagaged along the gear train, resulting in a side thrust at each gear axle. A selected gear in the train, the tripping gear, is urged temporarily out of position, this motion being communicated to actuate the polarity reversing switches to a latched rewind condition. The tripping gear is then set back to its original position by a spring. In the preferred form of the invention, gear tolerances are chosen such that the tripping gear remains fully engaged in the rear train throughout. During rewind the cassette spool is driven through a conventional swinging engagement of a satellite gear to drive the cassette spool to take in the film.

According to another basic feature of the invention, an automatic film engagement means is provided so that when loading a fresh cassette into the camera the usual threading of the film leader or tongue into the take-up spool is eliminated. The take-up spool is configured in the form of a drum and carries one or more unilateral engaging hooks projecting above the periphery of the drum so as to releasably engage sprocket perforations on the film edge. During the film cassette loading operation, the operator may insert the cassette into the camera after opening the rear door or cover of the camera, and extend enough film leader to rest on the surface of at least a drive sprocket which is driven only initially along with the take up spool during film advance. By actuating the shutter release button, the drive sprocket and take-up spool are driven in the advancing direction, the sprocket moving the film to the take-up spool if it was not so moved by the user, where one of the rotating hooks engages a film perforation to capture the film end. The operator may then close the door and depress the shutter release button again to initiate a limited film advance operation to bring fresh film into the imaging region. The camera is then ready for subsequent use. In the preferred exemplary form of the invention the movement of the door unlatches the polarity reversing switches if they were in a latched condition.

According to a specific aspect of the automatic film capture feature of this invention, the film take-up spool is configured substantially larger than is customary, and in the preferred embodiment described herein, is of the order of the diameter of the dispensing cassette itself, thereby placing the unilateral hooks of the take-up spool substantially coplanar with the imaging plane of camera and significantly facilitating film capture. Only a slight increase in camera body thickness results from this.

According to another specific aspect of the automatic film capture feature of the invention, during the rewind operation both the cassette spool and the take-up spool are simultaneously driven, and the gear train is designed such that the take-up spool is driven slightly overspeed with respect to the cassette spool as to insure proper release of the film from the unilateral hooks.

According to another specific aspect of the automatic film capture feature of the invention, a propulsive assist feature is provided by a unidirectional rotary drive means coupled to a film engaging sprocket ahead of the take-up spool. The principal function of the sprocket during film advance is to be driven by the film to sense film movement and govern film advance termination between successive frames. The ratios in the gear train driving the drive sprocket and take-up spool are such that the drive sprocket is always driven somewhat under speed with respect to the peripheral speed of the take-up spool. Thus, when film capture occurs tension is imparted to the film by the take-up spool so that the sprocket is driven by the faster moving film to an overspeed condition and a unidirectional rotary clutch connecting the sprocket to the gear drive disengages the sprocket from the drive source, whereupon it serves its normal function of acting as a film-driven framing sensor.

By the foregoing means a simple, inexpensive, and reliable automatic film engagement system is provided which enabled extremely rapid film loading of the camera, and which provides a margin of error for the user. Such a capability greatly facilitates the use of such a camera in those situations for which automatic film advance cameras are particularly suited and adapted, namely photography of high speed or highly changing situations, such as sporting and news coverage, wherein a great many pictures must be taken in rapid succession. A film loading operation that normally takes of the order of a minute even in experienced hands is thus reduced to a matter of a few seconds.

According to a third basic feature of the invention, the drive motor is placed inside the takeup spool, so that no significant increase in camera size is required.

Other objects, advantages, and features of the invention will become apparent upon making reference to the description to follow, the drawings, and the claims.

BRIEF DESCRIPTION OF DRAWINGS

FIGS. 1A and 1B are schematic views of the switching circuitry for an electrically-driven camera in the advance and rewind configurations respectively;

FIG. 1C is the switching logic truth table of the circuit of FIGS. 1A and 1B with switch S4 closed;

FIG. 3A is a perspective view of the gear train drive interconnecting an electric motor inside the take-up spool to a drive gear mounted on the takeup spool.

FIG. 3B is a cross section of the take-up spool assembly, showing a film drive motor inside the spool;

FIG. 4 is a replica of the view of FIG. 3, showing the gear configuration and film position at end of film rewind.

FIG. 4A is a perspective view of the two principal elements of the end of rewind sensing switch;

FIG. 5A is a top plan view of a tripping gear engagement between the motor and subsequent gearing;

FIG. 5B is the gear configuraton of FIG. 5A at the instant of transition from film advance to film rewind configuration, wherein the tripping gear is momentarily offset;

FIG. 8A is a top plan view of a tripping arm assembly actuatable by the tripping gear of FIGS. 5A and 5B, and shows motor polarity switches in the film advance configuration.

FIGS. 8B and 8C show details of the tripping plate at the moment of transition from film advance to film rewind condition, showing latching of the polarity reversing switches to the rewind configuration.

FIGS. 10A, 10B, and 10C are replicas of the views of FIGS. 9A, 9B, and 9C immediately after shutter release;

FIGS. 11A, 11B, and 11C show the same assemblies near the end of the winding operation with the shutter almost cocked;

FIG. 12 is a top plan view of the toggle plate region shown in FIGS. 8A and 8B, wherein the film loading door is open and the toggle plate is returned to the film advance position.

DETAILED DESCRIPTION OF THE INVENTION

Figures 2, 3:
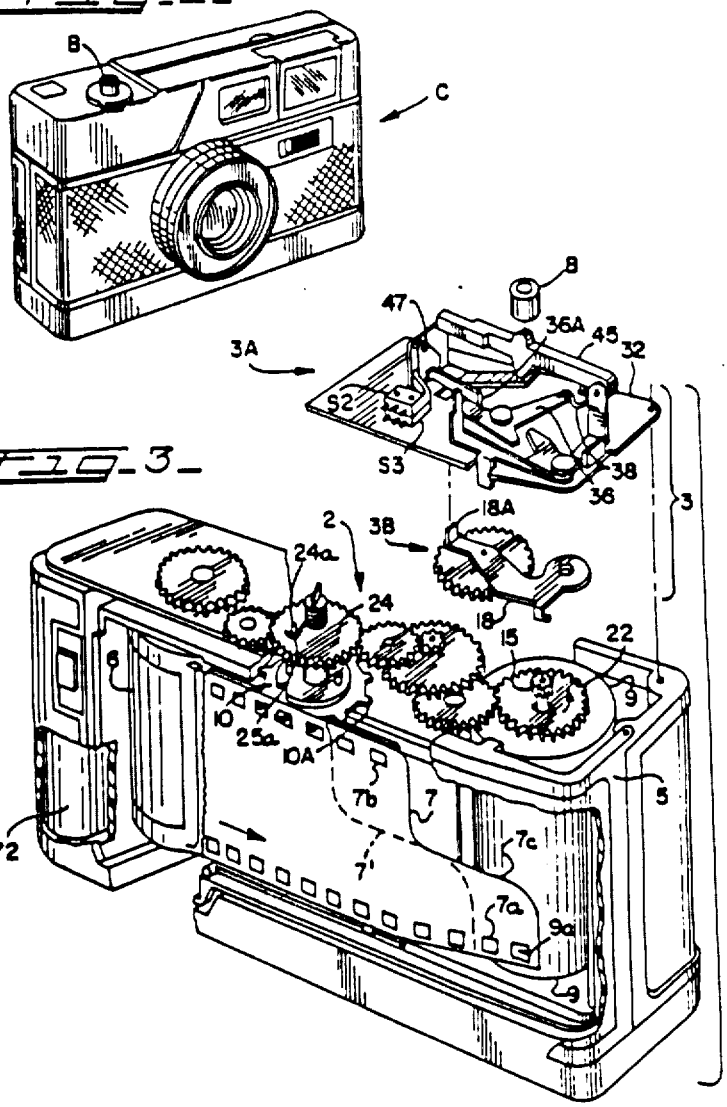
FIG. 2 is a perspective view of the camera.
FIG. 3 is a partially-sectioned exploded partial view of the camera shown in FIG. 2 showing the principal elements of a drive gear train and sprocket, and a switch carrying plate. Details of film engagement are also shown.

The present invention concerns a 35 mm still camera which utilizes an integral electric motor for film transport. After each exposure the film is advanced automatically to the next frame and the shutter is recocked. An end of film condition during film advance is signaled by a sudden increase in pay-out tension in the film, which trips an electrical switch which latches in a film rewinding condition to reverse the motor drive power so as to drive the pay-out spool in the cassette to rewind the film back into the cassette. Termination of rewind is achieved by a sensing switch which terminates motor power as soon as the film leader passes the imaging-framing area of the camera.

FIG. 1A shows the motor circuit in the film advancing state, and FIG. 1B shows the motor circuit in the rewinding state. The motor circuit is controlled by four switches in which S1, S2, and S3 are single-pull, double-throw switches actuated by actuating elements A1, A2, and A3 respectively. The switches S2 and S3 are described as being in the "off" states when they are not actuated by the actuating elements A1, A2, and A3, and in the "on" stages when they are actuated.

FIG. 1C is a representation of the switching logic of the motor drive system for all cases in which the switch S4 is closed. Referring to the truth table of FIG. 1C, it will be noted that there are two switch configurations giving rise to a rewind condition, and one configuration giving rise to a reverse polarity applied to the motor 1 to drive it in the film advance direction. By inspection of all other possible switching configurations one may establish that such other configurations invariably give rise to a short-circuit condition across the terminals of a motor 1. The motor 1 is preferably of the permanent magnet type, wherein such short-circuit condition gives rise to a braking or freezing action on motor rotation.

FIG. 1A represents the electrical configuration of the motor drive circuit when the camera is in the "rest" state with the shutter cocked and ready for the next exposure. The switch S1 at this point is in the "off" state. Immediately after the shutter is actuated and the frame is exposed, switch S1 is tripped by delayed mechanical means subsequently to be described to the "on" state, thus closing the motor circuit and energizing the motor 1 to the advance condition, as will be noted by reference to the table shown in FIG. 1C. The motor 1 then runs in the direction indicated as advancing in FIG. 1A, and continues to run until exactly one exposure frame of film is transported, as determined by mechanical sensing means subsequently to be described. The switch S1 then snaps back to its "off" state, opening the motor circuit and shorting the two motor terminals, thus, providing an electrical braking force to bring the motor 1 to an immediate standstill. The camera is again in its "rest" state and ready for the next exposure. The switch S4 is normally closed throughout all advance and rewind operations, and serves only to shut down the system after the film leader has been withdrawn from the film framing area during rewind operation.

In the rewinding state of the camera, mechanical linkages actuated by the previously mentioned rise in pay-out tension in the film leader actuate both switches S2 and S3 to the "on" state, thereby closing the motor circuit to drive the motor in the opposite direction as indicated in FIG. 1B and according to the switching logic table of FIG. 1C. The status of switch S1 is irrelevant during the rewind operation. When the roll of film is rewound to the condition that the film leader has just passed over the location of switch S4 at the film plane, switch 4 is opened and rewinding stops.

FIG. 2 is a perspective view of the camera C, showing the location of shutter actuating button B. FIG. 3 is a partially cutaway exploded perspective view of the camera C showing the principal elements of a transmission gear train 2 and a tripping mechanism 3 consisting of upper tripping assembly 3A and a lower tripping assembly 3B. The lower tripping assembly 3B is pivotally mounted to the lower surface of base plate 32 of the upper tripping assembly 3. With film compartment door 5 closed, the camera loaded with a film magazine 6 is shown in its advancing or winding state. Motor power is derived from one or more batteries 72. FIG. 3 shows switches S2 and S3 of FIG. 1 mounted on plate 32 and unactuated in the winding state, i.e. both are in their "off" (unactuated) state. The film 7 is held at the film plane by means of a pressure plate (not shown) mounted on the film compartment door 5. The film 7 advances in the direction of the arrow shown in FIG. 3, wherein it is wound in the advancing direction on a take-up spool 9 by means of an integral hook 9a engaging with the lower row of film perforations 7a. Under such conditions the take-up spool 9, when driven by the motor 1 housed inside the take-up spool 9 (see FIG. 4) through the transmission gear train 2, rotates in an anti-clockwise direction when looking from the top side of the camera in FIG. 3. This corresponds to the direction of rotation of the motor shown in FIG. 1A, the motor circuit. The upper row of film perforations 7b engage with the teeth 10A of a film sprocket 10, to cause the film sprocket to rotate. As will subsequently be discussed, the rotation of the film sprocket 10 is sensed and utilized to index each exposure frame of the film as it advances. Half revolutions of the film sprocket 10 correspond to an advance of exactly one exposure frame of the film.

FIG. 4 shows the camera in its rewinding state. Both switches S2 and S3 on the upper tripping assembly 3A have been driven to the on condition by means subsequently to be discussed, thereby placing the motor in the rewinding state indicated in FIG. 1B. During rewind, a drive shaft 14A engaging a spool (not shown) inside the film cassette 14 is driven by motor 1 through the transmission gear train 2 to rotate in a clockwise direction as viewed from the top of the camera. The film then runs in the direction of the arrow shown therein. The take-up spool 9 is simultaneously driven at a faster rate to rotate in a clockwise pay-out direction, and eventually the entire length of film 7 runs away from the spool 9 when the lower row of film perforations 7a disengages from the hook 9a of the spool 9. Throughout the course of rewinding the rewinding stop switch S4 remains "on", a necessary condition for actuating the motor rewind circuit, as will be noted in FIG. 1B.

The film 7 also engages with the rewind stop switch S4 (see also FIGS. 1A and 1B) located at the lower corner of the imaging area nearest to the take-up spool 9. The tension of the film presses down an actuator 11 of the switch S4 and causes electrical strips 12 and 13 (FIG. 4A) to contact. During advance, the switch S4 is "on" but has no effect on the motor energization, as may be verified by inspection of the truth table 1C.

When the film is rewound to the point that the tongue 7C of the film 7 has just passed over the actuator 11, the actuator 11 is released, opening the contact between strips 12 and 13, thereby causing switch S4 to actuate to the "off" condition, thereby stopping the rewind operation. Under such conditions, the camera is ready for unloading.

FIG. 3A shows a simplified view of the drive train for the take-up spool 9. The motor 1 is rigidly secured to the camera frame by a motor base mount 31. The takeup spool 9 rotates about the motor base 31 guided by an engaging shoulder 62. The motor gear 15 is rotated by the motor shaft 1A to drive spur gear 16A of a tripping gear assembly 16 (see FIG. 5A) consisting of the spur gear 16A affixed to a tripping pinion 16B. Tripping pinion 16B drives a transmission gear assembly 20 consisting of upper and lower pinions 20B and 20C, respectively, affixed to a spur gear 20A. The lower pinion 20C drives a film winding gear 21, which in turn drives a take-up spool gear 22 affixed to the top of the take-up spool 9. The transmission gear upper pinion 20B also drives a rewind transmission gear 23 to transfer drive power to the film cassette spool during the rewind operation, as will subsequently be discussed in detail.

Figure 5:
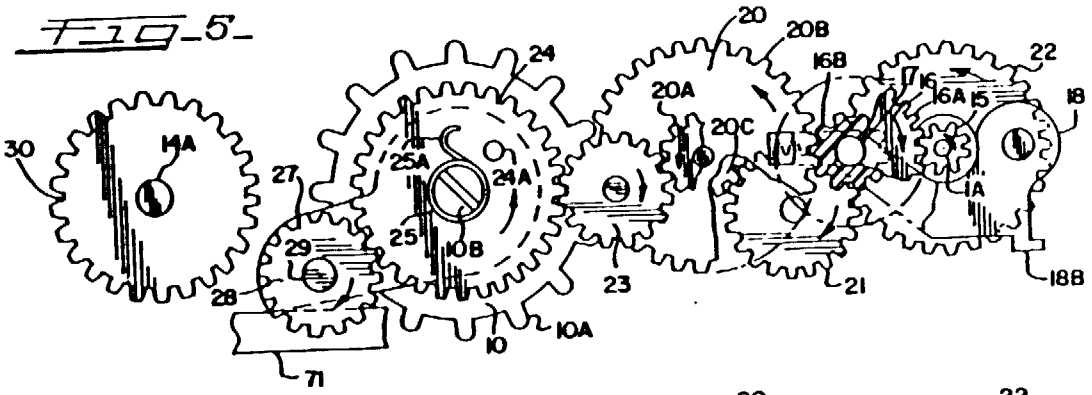
FIG. 5 is a partially-sectioned top plan view of the gear train elements shown in FIGS. 3 and 4 in the film advance configuration.
Figure 6:
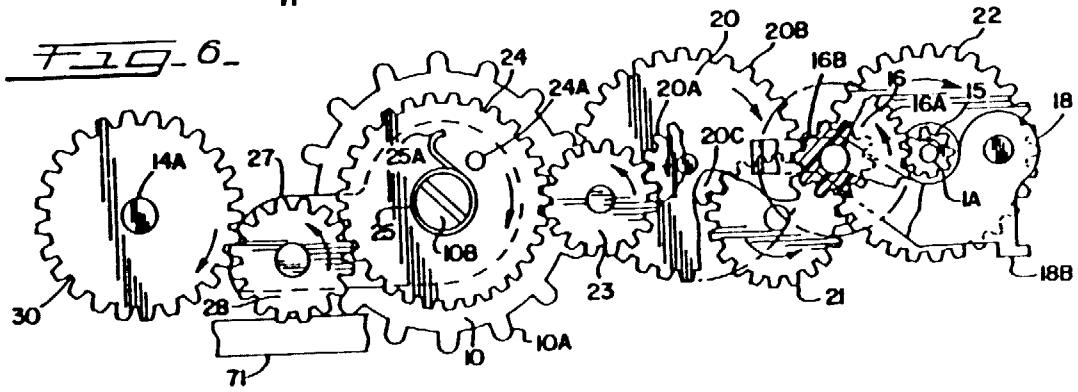
FIG. 6 represents the drive gear configuration shown in FIG. 5, with a satellite gear swung into engagement for the rewind operation.

FIGS. 5 and 6 show the transmission gear train 2 (FIGS. 3 and 4) of the camera in the winding and rewinding states respectively. Both winding and the rewinding of film 7 utilize the same motor 1 and the same transmission gear train 2, except for one change in engagement among the gear members. All the gears except the tripping gear assembly 16 (FIGS. 3 and 4) and the rewind gear 29 are driven to rotate about fixed axles. In the winding state of the camera, the motor 1 and hence the motor shaft 1a and the motor gear 15 rotate in the anti-clockwise direction as indicated by the direction of the arrow in FIG. 5. The tripping gear 16b which is a member of the lower tripping assembly 3a (See also FIG. 5A) rotates about an axle 17 which is mounted on the tripping lever 18. The tripping lever 18 is pivoted at one end around the axle 19 so that the former is rotatable about the latter. Under such arrangement and when under a lateral force, the tripping gear assembly 16 may travel laterally, while still maintaining engagement with both the motor gear 15 and the transmission gear assembly 20, and cause the tripping lever 18 to rotate about the pivot 19, to actuate the tripping mechanism 3 for auto-rewind by actuation of switches S2 and S3, as will be described later.

Referring again to FIGS. 5 and 3A, during advance the transmission gear upper pinion 20B of transmission gear assembly 20 drives through gears 20A and 23 a clutch gear 24 to rotate it in the anti-clockwise direction. A rewind gear 28 is rotatable about its axle 29, which is mounted on a mounting plate 27. The plate 27 is pivoted about the hub 24B (see FIG. 7A) of the clutch gear 24 so that it is free to rotate about the axis of gear 24. The plate 27 is held in moderate frictional engagement with the lower face of the clutch gear 24. Under such an arrangement, the anti-clockwise rotation of the clutch gear 24 tends to rotate the mounting plate 27 counterclockwise. Thus, the rewind gear 28 is revolved away from and disengages from a drive gear 30 which drives the supply spool shaft 14a. The rotation of the mounting plate 27 is stopped by means of an integral part of the camera body 71. The supply spool shaft 14a is then free to rotate in the anti-clockwise direction as film 7 is pulled out of the film magazine 14 during winding of film.

Mechanical film transport systems for automatic rewind cameras employing a drive reversal based upon a rise in film tension pose requirements that conventional drive systems cannot reliably meet. Such conventional systems typically employ a continuously driven sprocket to engage and advance the film, with the take-up spool driven overspeed through a slip clutch. Thus, a tight film wrap about the take-up reel is achieved, but the film is under constant tension as a result. If autorewind is to be initiated by sudden increase in tension then such tension may be sensed either at the take-up spool or at the driven sprocket. If sensed at the take-up spool, i.e. by a sudden rise in loading of the take-up spool drive, then the slip clutch must be capable of somehow transmitting the sudden rise in torque back along the drive system for sensing. Since the clutch is already in a slipping condition, such a system would either be impracticably complex, unreliable, or both. Mechanically actuated drive reversal based upon a tension sensing from the driven sprocket, although feasible in principle, would in practice throw such a load onto the film through the sprocket as to tear the film. The present system utilizes direct drive by the take-up spool, using the sprocket principally as a framing sensor driven by film passage.

The mechanism for initiating rewind in such a system involves reflected torques in the gearing driving the take-up spool.

FIGS. 5A and 5B show that part of the transmission gear train 2 which consists of the motor gear 15, the tripping gear assembly 16 carried by the tripping lever 18 pivoted axle 19, and the transmission gear assembly 20. After the last exposure of a roll of film has been taken, the motor 1 keeps on driving the transmission gear train 2 for winding up films on to the take-up spool 9. However, such winding operation is eventually prohibited because no more film is available from the film magazine 6 as the trailing end of film is permanently attached to the inside core of the film magazine 6. Referring to FIG. 3A, it is evident that if film pay out stops, then the take-up spool 9 is effectively frozen. Since torque continues to be applied by the motor gear 15, each gear in the train, i.e. 15, 16A, 16B, 20A, 20C, 21, and 22, is subjected to a high torque condition. Referring now to FIG. 5A, it will be seen that the teeth of the tripping spur gear 16A are forced clockwise by the motor gear 15, whereas the tripping pinion 16B, which is rigidly affixed to the tripping spur gear 16B, is engaging the frozen transmission spur gear 20A. The tripping pinion 16B thus attempts to satellite on the transmission spur gear 20, carrying the tripping lever 18 to the offset position shown in FIG. 5B. This offsetting of the tripping lever 18 serves to actuate the upper tripping assembly 3A (FIGS. 3 and 4) to latch the motor polarity switches S2 and S3 into the reverse motor drive configuration of FIG. 1B by means which will be subsequently discussed. Upon such reversal the motor 1 is driven in the opposite direction, the high tension which actuated the offsetting shown in FIG. 5B disappears, and the tripping lever 18 returns to its normal state (FIG. 5A) for the duration of the rewind operation. The backlash between engaging gear teeth are of dimension such that during offset, the tripping gear assembly 16 is always in engagement with both the motor gear 15 and the transmission gear 20A.

FIG. 6 shows the transmission gear train 2 in the rewinding state of the camera. All the gear engagements described above for the winding state obtain for the rewinding state. However, the motor 1 (FIG. 3A) and the motor gear 15 rotate in the clockwise direction, driving the transmission gear train 2 in the reverse sense. The take-up spool 9 is then driven in the clockwise direction unwinding film 7. The clutch gear 24 is now driven in the clockwise direction and rotates the mounting plate 27 away from its stopper 71. The rewind gear 28 is then forced to engage with the gear 30 for the supply spool shaft 14. Under such condition the core of the supply spool (not shown) in the cassette (FIGS. 3 and 4) is driven to rotate in the clockwise direction and the film 7 is rewound back into the film magazine 6.

FIGS. 8A through 11C show the tripping mechanism 3 (see FIGS. 3 and 4), and a shutter mechanism in the various states of actuation of the camera. FIGS. 8A and 8B are partial top plan views of the tripping mechanism 3 showing the conditions of the switches S2 and S3. FIGS. 9 to 11 are partial top plane views and front elevations showing the shutter release conditions. In FIGS. 8 through 11 the tripping lever 18 (see FIGS. 3, 4A, 5A, 5B) is shown in dotted lines, as it is mounted underneath the baseplate 32.

FIG. 8A shows the mechanism resting in the winding state ready for the next exposure. The tripping gear 16 and the tripping lever 18 are in the positions as shown in FIG. 5A. They are held in such positions by a tension spring 34 hooking onto a hook 18b on the tripping lever 18. The other end of the spring 34 is hooked to a fixed pin 35 on the baseplate 32. In FIG. 8A the spring-loaded tripping lever 18 is stipped in the position as shown by a projection 18a engaging the side of a rectangular hole 33 in the baseplate 32. A two-position toggle lever 36 pivoted about an axle 37 has three lever arms 36A, 36B, and 36C. The toggle lever 36 is spring-urged by a horseshoe-shaped spring 38 to one of two stable positions, pivoting about the axle 37. The spring 38 is rotatably hooked at one end about a fixed pin 39 on the baseplate 32, and similarly engages a pin 36b on one arm of the toggle lever. The spring 38 is under compression at all times, and thus if the end of the spring arm 36b is exactly on the straight line joining the pivot 37 and the fixed pin 39, the toggle spring 38 is compressed with the maximum force. This corresponds to an unstable state of the toggle lever 36, and under such condition it has the tendency to snap and rotate in either direction to a more stable position. In FIG. 8A the toggle lever 36 is shown snapped clockwise to one stable position with the end of the spring arm 36b on one side of the straight line joining the pivot 37 and the fixed pin 29. In this configuration the projection 18a of the tripping lever 18 is held by tension of the return spring 34 (FIGS. 5A and 5B) to engage the lower edge of a slot 33 in the baseplate 32 through which the projection 18a passes. The rotation of the toggle lever 36 in the clockwise direction is arrested by contact of a tripping arm 36a integral with the toggle lever 36 striking the projection 18a, as shown in FIG. 8A. This corresponds to the winding (advancing) state of the camera. FIG. 8B shows the interaction of the toggle lever 36 and the tripping level 18 at the instant of transition from winding to rewinding configuration. The momentary offset of the tripping lever 18 forces the tripping arm 36a upward to press against actuator 43 of switch S2 and actuator 44 of switch S4 (see detail FIG. 8C). The tripping arm 36 is now latched in the rewind configuration, holding switches S2 and S3 in the actuated, or 'on' condition. Any subsequent motion of the tripping lever 18 has no effect once the tripping arm 36 is latched for rewind. Reference to the switching table of FIG. 1c shows that with switches S2 and S3 latched to the 'on' state, the motor is actuated to rewind the film, irrespective of the state of switch S1. Thus, mechanically actuating the tripping arm 36 to the rewind state causes automatic film rewind. Reset of the toggle lever 36 to the winding position is accomplished by engagement of a third arm 36C of the toggle lever 36 with a lever arm 40a of a reset lever 40 (FIG. 12). This reset operation occurs when the film compartment door 5 (FIGS. 3 and 4) is opened for film replacement and will be discussed in detail subsequently.

The shutter release and cocking system and the associated swquenching of switches during exposure and film advance will next be discussed. FIG. 9 shows various elements of the shutter and film advance systems in the winding (advancing) configuration with a shutter 55 closed and the mechanism cocked. FIG. 10 shows the system the instant after shutter release with the shuttet open. FIG. 9 shows the system with the shutter 55 again closed and the shutter mechanism in the act of recocking during film advance.

FIG. 9 shows switch S1 affixed to the camera body proximate to a film sprocket 10 consisting of sprocket teeth 10A, a sprocket hub 10b, a cam 10c having detents 10d, and two sprocket pins 10e. The sprocket 10 is preferably of unitary one-piece construction.

Figure 9A:
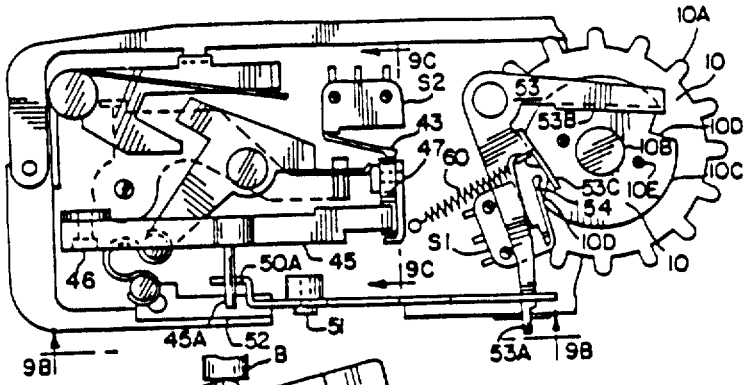
FIG. 9A is a top plan view of shutter actuator engagement of a tripping lever, the film sprocket, and a framing sensing switch.
Figure 9B:
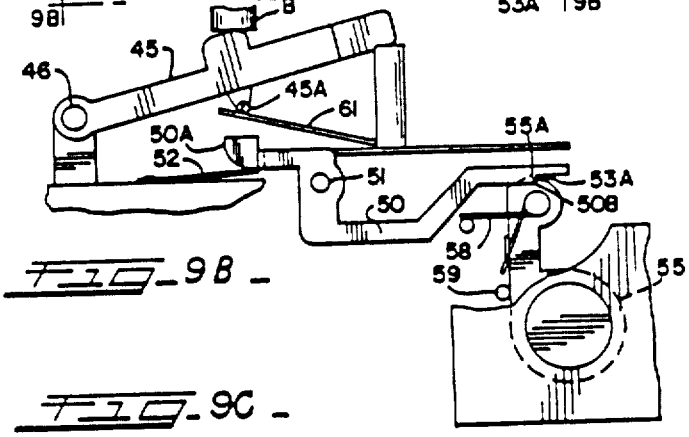
FIG. 9B is a front elevation of the assembly shown in FIG. 9A showing the relationship of the shutter actuation and tripping mechanism.
Figure 9C:
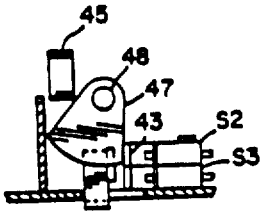
FIG. 9C is a side elevation of the vicinity of the polarity switches of FIG. 9A, showing selective engagement of a selector lever with one of the switches.

With the camera in the cocked configuration shown in FIGS. 9A, 9B, 9C a shutter 55 is held in the closed position against a stop 59 by a spring 58. A leaf spring 52 presses one end 50a of a shutter release lever 50 so as to press the other end 50b of the shutter release lever into trapping engagement with a shutter actuator 53 against a cocking step 50b in the shutter release lever. An outboard arm 53a of the shutter actuator is spring-urged by a spring 60 to press the outer arm 53a into secure engagement with the cocking step 50b. Exposure is initiated by the pressing down on the exposure button B (see also FIG. 2) engaging a shutter release member 45, normally urged upward by a leaf spring 61, pressing the release member downward pivoting about an axle 46. During the initial movement downward of shutter release member 45 a sector lever 47 is rotatingly engaged (see FIG. 9C) to rotate and compress an actuator 43 of switch S2 against the spring force exerted by the lever arm 43 of switch S2. Thus, the first action on depressing the shutter button B is to actuate switch S2. Referring to the switching table of FIG. 1c, it will be noted that no motor actuation can occur in this switch configuration. Further depression of the release lever 45 causes an integral pin 45a on the release member to engage end 50a of the shutter release lever 50 thereby rotating the cocking notch 50b upward and out of engagement with the shutter actuator arm 53, thereby releasing the shutter actuator for clockwise rotation as seen in FIG. 9A.

FIG. 10 shows the configuration of the camera in the instant after the shutter actuator 53 has been released. The shutter actuator 53 rotates clockwise at very high speed, and its end 53a hits an engaging step 55a on the shutter blade 55 causing the latter to flip open. At the same time a lever arm 53c of the shutter actuator 53 actuates on lever arm 54 of the switch S1 thus tripping the latter to the 'on' state. However, the motor circuit still remains open because the switch S2 is still actuated to the 'on' state by the sector lever 47 as shown in FIG. 10C. The shutter actuator 53 is stopped in its released position (FIG. 10a) by the engagement with the lever arm 54 of the switch S1. Shortly after shutter release, the shutter blade 55 is forced to return to its closed position in touch with the stopper 59 by the shutter return spring 58.

Release of pressure on the pressure button B by the user allows the leaf spring 61 to raise the shutter release member 45. As the shutter release member 45 rises, the first action is to release engagement of pin 45a against the end of the shutter release lever 50a, allowing the shutter release lever 50 to be urged by spring 52 to press against a shutter actuator arm 53a in sliding engagement, as shown in FIG. 11B. Further upward travel of the shutter release member 45 releases pressure on the sector lever 47 (FIG. 11C), allowing the tension of which switch actuator arm 43 to rotate the sector lever 47 back to its original position, thereby returning switch S2 to the unactuated or 'off' state. Referring to the switch table of FIG. 1c one notes that the switches are now configured to drive the motor in the advancing direction. The motor circuit is thus closed, and the winding of film automatically starts. FIG. 11A shows the shutter mechanism during film winding. Referring to FIG. 3, the motor 1 runs in the anti-clockwise direction and drives the transmission gear train 2 in the sense to wind up the film onto the take-up spool 9. As film 7 travels in the direction of the arrow shown in FIG. 3, the film sprocket 10 is brought to rotate in the anticlockwise direction by the engagement between the teeth 10a and the upper row of film perforation 7b. From the truth table 1c, it follows that switch S1 must remain closed throughout the entire operat-on wherein the next frame of film is advanced. Switch S1 is engaged alternatively either by the cam surfaces 10c of the sprocket 10, or by an arm 53c of the shutter actuator 53. During the initial phases of the film advance operation the switch S1 is held closed by the engagement with the arm 53c of the shutter actuator in the position as indicated in FIG. 8a. During the initial stages of rotation of the sprocket 10 the shutter actuator arm 53c holds the switch S1 closed as shown in FIG. 10A. Subsequent rotation brings one of the pins 10e into engagement with an arm 53b of the shutter actuator 53 to initiate the cocking process. The onset of this condition is shown in FIG. 11A. By this time, however, the cam 10C has rotated to hold arm 54 of switch S1 into the activated position. Rotation continues, with pin 10e finally urging the shutter actuator into the cocked position in which element 53a of the shutter actuator arm has been returned to engage the cocking step 50b of the shutter release lever. Rotation continues until the configuration shown in FIG. 9A is once again achieved, whereupon arm 54 of switch S1, actuated by its own internal tension, springs outward into detent 10d of cam 10c to open switch S1. Power is thus removed from the motor 1, and as previously described, it is thus instantaneously electrically braked, and the winding of film immediately stops automatically. The shutter is now cocked and ready for the next exposure. The camer is again in its rest state with the states of switches S1, S2, and S3 restored for the next exposure as shown in FIG. 9A. The two pins 10e of the film sprocket 10 are located such that in the cocked state of the shutter they are in the positions well clear of the shutter actuator 53 during shutter release. The film sprocket 10 has two detents 10d and two pins 10e. The combination of one detent 10d and one paired pin 10e functions in one cycle of the camera operation, which consists of shutter release and winding of film. During this cycle, the other pair comprising detent 10d and pin 10e is not functioning. The two pairs are located exactly at 180° apart with respect to the axis of the film sprocket 10. Thus, exactly half a revolution of the film sprocket 10 corresponds to one cycle of camera operation in which exactly one exposure frame of film 7 is transported during the winding operation of film.

After the last exposure of a roll of film has been taken, the auto-rewind device of the camera is automatically tripped 'on' and the rewinding of film automatically starts as previously described. The motor 1 runs clockwise as seen in FIGS. 4 and 6 and derives the transmission gear train 2 in the sense to rewind the film 7 back into the film magazine 6 by means of the clockwise rotation of the supply spool shaft 14a, as described previously. The film sprocket 10 is brought to rotate clockwise by the travel of film 7 (in the direction of the arrow in FIG. 4) and the cam surface 10c and the detents 10d actuate the switch S1 to oscillate between the 'off' and 'on' states. However, the state of switch S1 does not affect the motor circuit during rewinding, as described previously. Recalling the details of shutter cocking by the pin 10E engaging the arm 53B of the shutter actuator as shown in FIG. 9, it will be recognized that the shutter actuator will also be retracted to the cocked position during film rewind. The rewinding of film 7 continues until the tongue 7c of the film 7 (see FIG. 4) has passed over the actuator 11 of the switch S4. The electrical strips 12 and 13 become separated and the motor circuit for rewinding is opened. Upon such instance, the rewinding of film automatically stops. The camera is ready for unloading fo the exposed roll of film.

Toggle lever 36 of FIG. 8B is reset to the advancing condition shown in FIG. 8A during film replacement. Referring to FIG. 12, reset lever 40 is urged in the counterclockwise direction about a pivoting axle 41 by a spring 42 engaging end 40b of the reset lever. With the compartment door 5 closed, as shown in FIGS. 8A and 8B, a lug 5a on the film compartment door engages the reset lever 40 to hold the reset lever rotated clockwise against the spring 42 as shown. Upon opening the camera door 5, as shown in FIG. 12, the pressure exerted by lug 5a on the reset lever 40 is released, allowing the reset lever to rotate in a counterclockwise direction, whereupon end 40A bears against end 36C of the tripping lever 36 to rotate the tripping clockwise to the film advance configuration as shown in FIG. 12. Closing the door 5 restores the position of the reset lever to the position shown in FIGS. 8 through 11 wherein its sole function is to act as a limit stop on the tripping lever 36 in the rewind position. The motor circuit is thus configured for winding, and the camera is then ready for reloading of a new roll of film.

Figure 7:
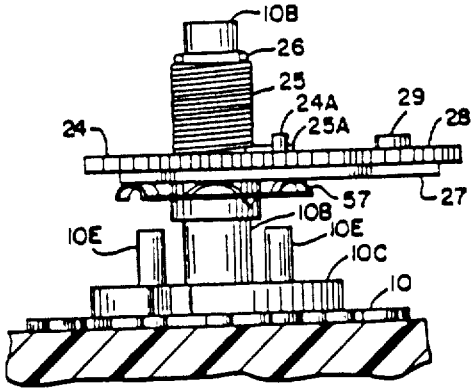
FIGS. 7 and 7A are a front elevation and a cross-sectional front elevational respectively of a unilateral drive spring clutch coupling assembly for a film engaging sprocket and an associated clutch gear.
Figure 7A:
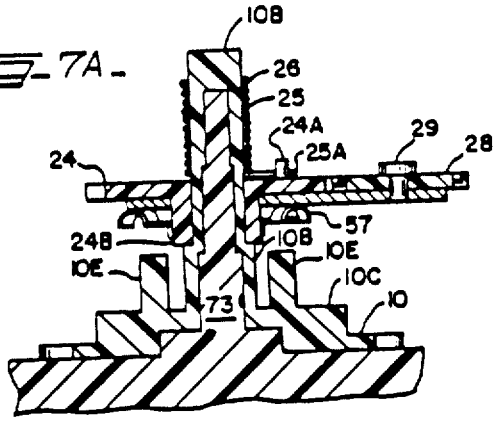

FIG. 7 shows the sprocket drive assembly of FIGS. 3, 4, and 9 through 11 inside elevation and in cross-sectional view (FIG. 7a). The sprocket drive assembly consists of the toothed sprocket wheel 10A, the camming shoulder 10C, the cocking pins 10E, and a unitary sprocket hub shaft 10B. The sprocket 10 is rotatably mounted on a spindle 73 affixed to the camera body. The clutch gear 24 is freely rotatable about the sprocket hub 10b. The gear plate 27 carrying the rewind gear 28 (FIGS. 5 and 6) is rotatable about a hub extension 24B of the clutch gear 24. On top of the clutch gear 24 sits a lefthanded helical spring 25 which grips onto the hub 10b of the film sprocket 10, the spring having a hook 25A which is able to engage the pin 24B of the clutch gear 24. The clutch gear 24 and the spring 25 are held vertically fixed to the film sprocket 10 by the retainer 26 which grips tightly onto the top part of hub 10B of the film sprocket 10. The mounting plate 27 is held pressed upward into friction contact against clutch gear 24 by means of the grip spring 57, which has a gripping projection 57A that grips firmly to the hub 24B of the clutch gear. The mounting plate 27 is then rotatable about the common axis of the film sprocket 10 and the clutch gear 24.

The spring 25 is merely loosely retained by the retaining clip 26, and constitutes a unirotational coupling between the clutch gear 24 and the sprocket shaft 10B. Referring to FIGS. 3 and 5 any strain on the hook 25A brought either by rotating the clutch gear 24 to insert the gear pin 24A into the hook or by rotating the sprocket to swing the hook to capture the gear pin results in a wrapping action of the spring 25 about the shaft 10B, and the sprocket and the clutch gear are coupled to rotate in synchronism. This condition is shown in FIG. 3. If, however, the clutch gear 24 outruns the sprocket 10, and hence the spring 25, in a clockwise direction or alternatively, the sprocket outruns the clutch gear in a counterclockwise direction, no such engagement is possible, owing to absence of tension in the spring wrap. The former condition is encountered during rewind and places conditions on overall gear ratios in the system. The latter conditions bears on an autoloading propulsion assist and a transition therefrom during initial film engagement and film advance. Both considerations will subsequently be discussed in detail.

When the camera is loaded with a roll of film and is in the winding state, the clutch gear 24 is driven by the gear train 2 to rotate anti-clockwise as shown in FIGS. 3 and 5, and the pin 24A engages with the hook 25A to rotate the hub 10b and thereby the film sprocket 10 also anti-clockwise. However, the film sprocket 10 is also driven by the travel of the film 7 because of the engagement of the upper row of the film perforations 7B with the sprocket teeth 10A. The gear transmission ratios are designed such that the rotation of the film sprocket 10 brought by the film 7 is always slightly greater than that brought by the clutch gear 24. For reasons just described, during winding of film, the pin 24A will not engage with the spring hook 25A, hence there is relative rotation between the film sprocket 10 and the clutch gear 24. In any case, the film framing is always governed by the rotation of the film sprocket 10. The rotation of the clutch gear here only serves the purpose of disengaging the rewind gear 28 from the gear 30 for the supply spool as described previously. In the rewinding state a similar situation arises, but here both the film sprocket 10 and the clutch gear 24 rotate clockwise.

The gearing is chosen such that during rewind the cassette shaft 14A is always driven at a relatively low takeup rate with respect to gear-driven free rotation rate of the sprocket 10. Thus, the gear train attempts to urge the sprocket 10 to propel the film 7 toward the cassette 6, but as previously described, the clutch gear outruns the sprocket, the unirotary coupling disconnects, and the sprocket supplies no translational force to the film, simply rotating freely during rewind.

An additional purpose of such a unidirectional sprocket engagement is to deal with switching configurations encountered when there is no film in the camera, when S4 (FIGS. 1, 4A) is open. Recalling that opening the camera loading door 5 (FIG. 12) forces the toggle lever 36 to the film advance condition and sets switches S2 and S3 (FIG. 1) to the "off" condition, inspection of the motor drive circuit of FIGS. 1A and 1B shows that with S4 open, a configuration on-off for switches S1, S2, and S3 respectively all actuate the motor 1 into the winding state. No other configurations will actuate the motor. Having reset the switches S2 and S3 to the "off" condition by opening the loading door 5, the motor 1 will subsequently run in the winding direction if S1 is "on". Since S1 is actuated to the "on" condition either by rotation of the sprocket 10 to bring one of the cam sectors 10c into engagement, as shown in FIG. 11A, or by actuation of the shutter release mechanism to bring arm 53c of the shutter actuator 53 into engagement, as shown in FIG. 10A two situations will cause the motor 1 to run indefinitely in the advance direction unless measures are taken to return S1 to the 'off' condition.

The first situation arises during the rewind operation when passage of the film tongue 7 (FIG. 4) passes the actuating pin 11 of switch S4, opening switch S4 and terminating motor rewind. Since the angular position of the sprocket 10 at this time is in general arbitrary, the sprocket, which is driven by film passage, may come to reset such that switch S1 will be actuated by one of the sprocket cams 10c (FIGS. 9, 10, 11) to the "on" condition. The unirotary spring coupling system then serves to restore switch S1 to the "off" condition as follows:

the motor 1 runs anti-clockwise and drives in turn the clutch gear 24 to rotate anti-clockwise. The film sprocket 10 is also driven anti-clockwise because the clutch gear pin 24A is gear-driven to capture the spring hook 25a. The film sprocket 10 then rotates until the lever arm 54 of switchs 1 falls into one of the detents 10d, thereby opening switch S10 and terminating the winding operation.

The second situation arises when there is no film in the camera and one plays with the camera by depressing the shutter release button. Switch S1 is driven closed by engagement with the shutter actuator, as shown in FIG. 10A, and the motor 1 is actuated to drive the gear train in the film advance direction. Since there is no film engaging the sprocket 10, the sprocket is not driven into rotation by the film such that the shutter actuator 53 can be recocked by the usual sprocket pin engagement shown in FIG. 9a. Here again, the hook spring engagement serves to substitute for film engagement, and drives the sprocket 10 in the counterclockwise direction to complete the cocking process of the shutter actuator 43, thereby restoring switch S1 to the open condition shown in FIG. 11A thus terminating motor drive in a proper sequence ready for the next shutter actuation.

An autoloading feature is incorporated into the camera, whereby the usual necessity for threading the film to the take-up spool during loading is eliminated. Referring to FIG. 3, it will be noted that simply by pressing the tongue 7 of the film against the take-up spool 9 and advancing the take-up spool one frame by actuating the shutter button B, one of the unilateral hooks 9a will automatically engage a film perforation 7a to secure the filmstrip 7 to the take-up spool. This is allowed with the back 5 (see FIG. 12) open, because such opening resets the switches S2 and S3 (FIG. 1) to the "on" or advancing condition as previously described. Should the operator negligently fail to insure the engagement of the filmstrip 7 to the take-up spool 9 during loading, as for example if the filmstrip were only extended as far as indicated by the dotted line 7' of FIG. 3, a propulsive assist to film engagement is provided by the sprocket 10. Upon actuation of the film advance, the pin 24a on the clutch gear 24 is driven counterclockwise to capture the hook 25a of the unirotary spring 25, thereby driving the sprocket to advance the film 7 towards the take-up spool 9 for capture. This guiding of the film 7 into touching contact with the take-up spool 9 is facilitated by the natural inward curving of the film resulting from wrapped storage in the cassette 6, or may alternatively by facilitated by a floating guide shoe of the type well known to the art. Since the gearing is such as to drive the sprocket 10 underspeed with respect to the rate of film takeup by the take-up spool after film engagement, immediately upon capture of a perforation 7a by the take-up spool 9, the driving function is taken up by the take-up spool. The sprocket 10 is then driven overspeed with respect to the clutch gear 24, the unirotary spring 25 uncouples, and normal film advance proceeds. To insure proper disengagement of the film 7 from the unilateral hook 9a at the end of the rewind operation, the gearing is such as to overspeed the take-up spool 7 with respect to the cassette spool drive via the cassette gear 30, resulting in an overall loosening of the film wrap around the take-up spool such that positive disengagement is insured. During rewind the take-up spool need only be driven slightly overspeed to insure positive film release, and thus no large buildup of loose film wrap occurs. This is further facilitated by the continuous reduction in the amount of film present on the take-up spool during the rewind operation.

Film capture is further facilitated by use of a take-up spool significantly oversize with respect to conventional designs, whereby the unilateral hooks 9a are disposed reasonably close to and more substantially in the imaging plane (see FIGS. 3 and 4). This is of material assistance during manual pressing engagement of the film perforations 7a onto the hook 9a, since the hook is more readily accessible then it would be in the case of conventional small diameter take-up spools. Here again, speed of loading is facilitated.

The use of an oversize take-up spool adds very little to the overall camera body thickness, and additionally allows the drive motor 1 to be located within the take-up spool as described herein. Here an offsetting space saving occurs, since conventional motor placement in the upper or lower portions of the camera adds to the overall height.

While for the purposes of illustration, various forms of this invention have been disclosed, other forms thereof may become apparent to those skilled in the art upon reference to this disclosure and, therefore, this invention shall be limited only by the scope of the appended claims.

I claim:

1. In a camera utilizing a 35 mm-type cassette film dispenser including a cassette housing containing a filmstrip having edge perforations and a film leader extending from the cassette housing, said camera having a film compartment covered by a door; a take-up spool in said compartment; motor means for driving said take-up spool; a film engaging rotary sprocket means disposed in advance of said take-up spool to engage said perforations during film movement; film capturing means on said take-up spool for engaging and capturing at least one of said perforations when said take-up spool is rotated in a film advancing direction; and transmission means for coupling said energized motor means to said take-up spool and to said sprocket means to propel said film towards said capturing means on the take-up spool when the leader on the filmstrip is placed over said driven sprocket means and at a speed slower than said capturing means is moved by said take-up spool; the improvement wherein there is provided repeatedly manually operable means not requiring the opening of said door for energizing said motor drive means each time it is operated for a predetermined period to advance the film at least one film frame after the initial loading of the film and before said film leader is wound on the take-up spool to the extent that an unexposed frame is in position to be exposed, to increase the likelihood that said capturing means can capture a film perforation if it fails to do so on the first operation of said manually operable means.

2. The camera of claim 1 wherein said film capturing means comprises at least one hook disposed to engage one of said perforations when said take-up spool rotates at an edge speed in excess of film travel speed in the film advancing direction and to release said engagement during rewind.

3. The camera of claim 1 wherein said manually operable means includes the manually operable shutter release means of the camera.

4. In a camera for receiving a cassette film dispenser for a filmstrip having edge perforations, said camera including a film compartment for said cassette; a filmstrip take-up spool in said compartment; filmstrip capturing means on said take-up spool for capturing a film perforation with said filmstrip laid against said takeup spool and to wind the same forwardly when said takeup spool is driven in an advancing forward direction; manually operable shutter release means; and motor means responsive to operation of said manually operable shutter release means for driving said take-up spool in a forward film winding direction to advance a captured filmstrip one frame, the improvement comprising: movable film engaging means for engaging a portion of said filmstrip intermediate said dispenser and said takeup spool and imparting an advancing movement thereto, said movable film engaging means being coupled to said motor means to be driven thereby initially until said filmstrip is captured by said capturing means, said movable film engaging means advancing said filmstrip at a lower speed than the takeup rate of said take-up spool, said movable film engaging means initially propelling the filmstrip towards said film capturing mmeans when the cartridge is initially loaded into said film compartment with the filmstrip placed into engagement with said movable film engaging means and the shutter release means is operated; and first film tension responsive clutch means for automatically decoupling said movable film engaging means from said motor means in response to the pull on the film upon engagement of a filmstrip perforation by said capturing means as said take-up spool drives the filmstrip at a higher speed than said motor means drives said movable film engaging means, said movable film engaging means thereafter during film advance remaining so decoupled and freely movable.

5. The camera of claim 4 wherein said take-up spool has a chamber therein, and said motor means is disposed within said chamber.

6. The camera of claim 5 wherein said motor means transmits power outside said take-up spool by a drive shaft freely passing through said take-up spool.

7. The camera of claim 4 wherein said decoupling means is a unidirectional coil spring tension clutch.

8. The camera of claim 4 wherein said capturing means is a unilateral releasable film capturing means, said cassette has a dispensing spool normally decoupled from said motor means and to which the end of the film is attached, and said camera has means responsive to the end of the film condition of said dispensing spool for coupling said motor means both to said take-up spool and said dispensing spool in a rewind direction, the take-up spool being driven at a faster peripheral rewind speed than said dispensing spool rewinds the film when said film capturing means is ready to be released therefrom.

9. The camera of claim 8 wherein said film capture means comprises at least one hook disposed to engage one of said perforations when said spool rotates at an edge speed in excess of film travel speed in the film advancing direction, and to release said engagement during rewind.

10. The camera of claim 8 wherein said film capturing means is a hook-like projection carried by said take-up spool which extends generally circumferentially in the same direction the film is to wind on said spool.

11. The camera of claim 4 wherein said film engaging means is a film metering sprocket to be engaged by the film perforations of the film moving towards said takeup spool and normally being driven by the moving film and terminating the operation of said motor means when said sprocket means is rotated by the film advancing one frame length.

12. The camera of claim 4 for a dispenser having a dispensing spool to which the end of the filmstrip is attached, and further included automatically operative rewind means including second film tension responsive means responsive only to an end-of-film tension condition in said filmstrip for causing said motor means to drive said dispensing spool in a rewind direction.

13. The camera of claim 12 further including means for decoupling the drive between said motor means and said movable film advancing means during rewind so that said film advancing means moves freely.

14. The camera of claim 12 wherein said motor means changes its direction of rotation from an advancing to a rewinding direction responsively to said second film tension responsive means at an end-of-film condition.

15. The camera of claim 12 wherein said rewind means includes reversing control means responsive to end-of-film condition for driving both said dispensing and take-up spools from said motor means in a rewind direction opposite to said advancing forward direction, and wherein said film capturing means is a film perforation engaging means and is configured releasingly to disengage from a loosely captive filmstrip when said take-up spool is driven in a rewind direction, the rewind rotational speed and the diameter of said take-up spool being chosen so as to pay out said filmstrip therefrom more rapidly than said given linear rewind rate of said dispensing spool at the time of release of said engaging means, so that said filmstrip unwraps from said takeup spool to lie as a loose coil disposed thereabout so as to allow ready disengagement of said film perforation engaging means from said filmstrip.

16. The camera of claim 4 wherein said first film tension responsive clutch means for decoupling said movable film engaging means from said motor means is a unidirectional coil spring tension clutch.

17. The camera of claim 12 or 16 further including gear transmission means for driving said takeup spool from said motor means, and wherein said second film tension responsive means includes movable gear mounting means for one gear of said gear transmission means, said one gear on said mounting means meshing with another gear of said transmission which normally couples the motion of said one gear to said take-up spool, said another gear being blocked from movement when all of the film is unwound from said dispensing spool, said one gear riding over said blocked another gear so as to move said gear mounting means into a rewind position, the movement of said gear mounting means to said rewind position actuating said rewind means to said operative condition to rewind said filmstrip.

18. The camera of claim 4 further including means for decoupling the drive between said motor means and said movable film advancing means during rewind so that said film advancing means moves freely.

19. The camera of claim 4, 18 or 13 wherein said movable film engaging means comprises at least one radially extending tooth having substantially steep radially extending leading and trailing edges and adapted to project into and substantially beyond a perforation of the filmstrip during wind and rewind of the filmstrip.

20. The camera of claim 13 or 18 wherein said decoupling means operative on film capture is also operative on rewind and includes clutch means comprising a first and a second rotating power transmission member mounted for rotation about a common axis, and a helical clutch spring member releasably coupling said first and second members to selectively transmit motor power therebetween from said motor means to said movable film engaging means, said first member configured over a portion of its length as a shaft and having said helical clutch spring disposed loosely coaxially therearound with a first end of said spring slidingly rotatingly secured to said shaft portion, the second end of said spring having a terminal portion thereof configured to captively releasably engage by rotation thereinto of a complementary engaging portion provided on said second transmission member, so that a relative rotation between said first and second transmission members in a first or engaging direction rotates said terminal portion of said clutch spring into captive engagement with said complementary engaging portion of said second transmission member to cause the wraps of said clutch spring to tighten securely about said shaft portion to lock said two transmission members to rotate together, and so that a relative rotation between said transmission members in the opposite or disengaging direction cannot cause said wrapping tightening engagement, so that no such locking action occurs, said motor means driving said movable film engaging means through said clutch means to impart a relative rotation to said transmission members in said engaging direction and propel said film in an advancing direction, said capture of said filmstrip thereafter so as to be driven by said takeup spool at a higher speed than the rate of said movable film engaging means there immediately causing a relative rotation of said transmission members in said disengaging direction to decouple said movable film engaging means from said motor means to allow said movable film engaging means to be freely driven by passage of said filmstrip, and the dispensing spool moves the film on rewind at a lower lineal speed then the peripheral speed of said second transmission member to prevent said complimentary engaging portion from engaging and tightening said spring on rewind.

21. The camera of claim 4 for a dispenser having a dispensing spool to which the end of the filmstrip is attached, and further including automatically operative rewind means including second film tension responsive means responds only to an end-of-film tension condition in said filmstrip to causing said motor means to drive said dispensing spool in a rewind direction.

22. The camera of claim 4 wherein said dispenser has a dispensing spool to which the end of the filmstrip is attached, and further includes automatically operative rewind means including second film tension responsive means responsive only to an end-of-film tension condition in said filmstrip for causing said motor means to drive said dispensing spool in a rewind direction.

23. In a still camera for receiving a filmstrip cassette including a dispensing spool to which one end of the filmstrip is attached, said camera including: a film compartment for said cassette in which is located a take-up spool having film perforation engaging means to capture said filmstrip with said filmstrip laid against said take-up spool and to wind the same forwardly when said take-up spool is driven in an advancing forward direction; manually operable shutter release means; motor means; drive means coupled to said motor means for driving said take-up spool in a film advancing direction for advancing said filmstrip forwardly one frame length responsively to each operation of said shutter release means; said drive means includes rewind means for effecting a rewind operation including means driven by said motor drive means for driving said dispensing spool of said casette in a rewinding direction to rewind said filmstrip over a range of linear rates, the improvement wherein said drive means include transmission means for driving both said dispensing and take-up spools from said motor means in a rewind direction during said rewind operation, and wherein said film perforation engaging means are configured to releasingly disengage from a loosely captive filmstrip when said take-up spool is driven in said rewind direction, the rewind rotational speed and the diameter of said takeup spool being chosen so as to pay out said filmstrip therefrom more rapidly than said given linear rewind rate of said dispensing spool at the time of release of said engaging means, so that said filmstrip unwraps from said takeup spool to lie as a loose coil disposed thereabout so as to allow ready disengagement of said film perforation engaging means from said filmstrip.

24. The still camera of claim 23 wherein said transmission means includes dispensing spool drive means for coupling the motion of said motor means to said dispensing spool only during film rewind, said drive means including control means having normally inoperative and operative forward wind and rewind operating conditions and being responsive to operation of said shutter release means by operating momentarily in said forward wind condition for activating said motor means and effecting the driving of said transmission means in a forward film winding direction to advance the film forwardly one frame length; end of film responsive means including movable gear mounting means for a first gear forming part of said transmission means, said first gear on said mounting means meshing with another gear of said transmission which couples the motion of said first gear to said take-up spool and to said dispensing spool drive means, said another gear being blocked from movement when all of the film is unwound from said dispensing spool, said first gear riding around said blocked another gear to move said gear mounting means into a rewind position, the movement of said gear mounting means to said rewind position operating and latching said control means in said rewind operating condition for continuously activating said motor means until rewind is completed and for effecting the driving of said transmission means in the reverse direction, said dispensing spool drive means then becoming coupled to said dispensing spool to effect a film rewind operation, and said first gear on said mounting means being in driving engagement with said another gear at all times so that said first gear drives said take-up spool although in opposite directions through said another gear during both forward wind and rewind operations.

25. The camera of claim 24 further comprising: end of rewind sensing means for sensing an end of rewind condition when the filmstrip is substantially rewound onto said dispensing spool; and said control means including switching means actuatable to an "off" condition by said end of rewind sensing means for de-activating said motor means to stop the film rewind operation.

26. The camera of claim 25 wherein said end of rewind sensing means includes a mechanical pressure member urged against a portion of said filmstrip outside said cassette and held to a fixed reference position by the presence of said portion of said filmstrip and said switching means includes an electrical switch actuated to a change of switching state by said pressure member departing from said reference position during rewinding.

27. The camera of claim 24 wherein said motor means is a DC motor and there is provided switching means controlling the connection of a source of DC voltage to said DC motor means, said control means includes latching means comprising a first mechanical member having a first and second stable position, said first mechanical member is urged by movement of said mounting means from said first to said second stable position, said first mechanical member operating said switching means to a wind condition when in said first stable position.

28. The camera of claim 27 further comprising reset means for resetting said latching means to reset said second switching means to an "off" condition.

29. The camera of claim 28 wherein said reset means comprises means for urging said first mechanical member to said first stable position.

30. The camera of claim 24 wherein said camera has a film loading door for said film compartment, said door having an open and a closed position, and means for unlatching said control means from said rewind operating condition when said film loading door is moved from one to the other of said positions.

31. The camera of claim 24 wherein said motor means includes a DC electric motor which rotates in opposite directions according to the polarity of the voltage applied thereto, and there is provided switching means for initially applying said voltage to drive said DC motor in a first film wind direction, said control means when in said latched condition reversing the connection of said voltage to said motor to drive the same in the opposite direction to effect a rewinding operation.

*32. In an electrically powered still camera for receiving a cassette film dispenser for a filmstrip having edge perforations, said camera including a film compartment for said cassette; a filmstrip take-up spool in said compartment; filmstrip capturing means on said take-up spool for capturing a film perforation with said filmstrip laid against said take-up spool and to wind the same forwardly when said take-up spool is driven in an advancing forward direction; manually operable shutter release means; film metering sprocket means for engaging a film perforation intermediate said dispenser and said take-up spool, and electric motor means energized in response to operation of said manually operable shutter release means for driving said take-up spool in a forward film winding direction to advance a captured filmstrip one frame, the improvement comprising: coupling means coupling said motor means to*

*said film metering sprocket means so that the motor means drives the sprocket means forwardly at a lower speed than said take-up spool is driven forwardly unless decoupled from the motor means when the film metering sprocket is driven by the film movement, said coupling means including one-way clutch means operable between a freely decoupled condition and an engaged non-slipping condition for automatically decoupling said movable film metering sprocket from said motor means during rewind and when said take-up spool drives the filmstrip at a higher speed than said motor means drives said sprocket means during film advance; film metering switch means responsive to the movement of said film metering sprocket for de-energizing said motor means after a one-frame advance of said filmstrip; and shutter cocking means coupled to said film metering sprocket for re-cocking the shutter of said camera attendant to a one-frame advance of said film-engaging means when the sprocket means is driven in a forward direction.*

*33. The powered camera of claim 32 wherein said film metering sprocket is positioned to engage the perforation in a portion of the film extending from said cassette dispenser to feed a film leader into capture position on said take-up spool.*

*34. The camera of claims 32 or 33 wherein said motor means when operated during a film advance is always coupled to said take-up spool without slippage or possible disconnection therebetween.*

*35. The camera of claims 32 or 33 wherein a rotation of said film metering sprocket means in a film-advancing direction with said motor means in a dormant state actuates said metering switch means to energize said motor means to cause a one-frame advance of said filmstrip.*

*36. The camera of claim 32 wherein said coupling means is a unidirectional spring tension clutch.*

*37. The camera of claim 32 wherein said take-up spool capturing means is a unilateral releasable film capturing means, said cassette when in said camera has a dispensing spool normally decoupled from said motor means and to which spool one end of the film is attached, and said camera has means responsive to an end of film condition of said dispening spool for coupling said motor means both to said take-up spool and said dispensing spool in a rewind direction, the take-up spool being driven at a faster peripheral rewind speed than said dispensing spool rewinds the film when said film capturing means is ready to be released therefrom.*

*38. The camera of claim 37 wherein said film capture means on said take-up spool comprises at least one hook disposed to engage one of said perforations in the film advancing direction thereof, and to release said engagement during rewind if film tension is released therefrom.*

*39. The camera of claim 37 wherein said film capturing means includes at least one hook-like projection carried by said take-up spool and which extends generally circumferentially in the same direction the film is to wind on said spool.*

*40. The camera of claim 32 for a cassette having a dispensing spool to which one end of the filmstrip is attached, and further including automatically operative rewind means including film tension responsive means responsive during film advance to an end-of-film tension condition in said filmstrip for causing said motor means to drive said dispensing spool in a rewind direction.*

*41. The camera of claim 40 wherein said motor means changes its direction of rotation from an advancing to a rewinding direction responsively to said film tension responsive means at an end-of-film condition.*

*42. The camera of claim 40 wherein said rewind means includes reversing control means responsive to end-of-film condition for driving both said dispensing and take-up spools from said motor means in a rewind direction opposite to said advancing forward direction, and wherein said film capturing means is a film perforation engaging means and is configured releasingly to disengage from a loosely captive filmstrip when said take-up spool is driven in a rewind direction, the rewind rotational speed and the diameter of said take-up spool being chosen so as to pay out said filmstrip therefrom more rapidly than the linear rewind rate of said dispensing spool, so that said filmstrip unwraps from said take-up spool to lie as a loose coil disposed thereabout so as to allow ready disengagement of said film perforation engaging means from said filmstrip.*

*43. The camera of claim 40 further including gear transmission means for driving said take-up spool from said motor means, and wherein said film tension responsive means includes movable gear mounting means for one gear of said gear transmission means, said one gear on said mounting means meshing with another gear of said transmission which normally couples the motion of said one gear to said take-up spool, said another gear being blocked from movement when all of the film is unwound from said dispensing spool, said one gear riding over said blocked another gear so as to move said gear mounting means into a rewind position, the movement of said gear mounting means to said rewind position actuating said rewind means to said operative condition to rewind said filmstrip.*

*44. The camera of claim 40 wherein said motor means includes gear transmission means having a plurality of meshing gears for engagingly driving said take-up spool, said rewind means includes means for driving both said dispensing and take-up spools from said motor means in a rewind direction, and including dispensing spool drive means for coupling the motion of said motor means to said dispensing spool only during film rewind, said motor means having associated therewith control means having normally inoperative and operative forward wind and rewind operating conditions and being responsive to operation of said shutter release means by operating momentarily in said forward wind condition for activating said motor means and effecting the driving of said transmission means in a forward film winding direction to advance the film forwardly one frame length, said end of film responsive means including movable gear mounting means for a first gear forming part of said transmission means, said first gear on said mounting means meshing with another gear of said transmission which couples the motion of said first gear to said take-up spool, said another gear being blocked from movement when all of the film is unwound from said dispensing spool, said first gear riding around said blocked another gear to move said gear mounting means into a rewind position, the movement of said gear mounting means to said rewind position operating and latching said control means in said rewind operating condition for continuously activating said motor means until rewind is completed and for effecting the driving of said transmission means in the reverse direction, said dispensing spool drive means then becoming coupled to said dispensing spool to effect a film rewind operation, and said first gear on said mounting means being in driving engagement with said another gear at all times so that said first gear drives said take-up spool although in opposite directions through said another gear during both forward wind and rewind operations.*

*45. The camera of claims 32 or 33 wherein said film metering sprocket comprises at least one radially extending*

*tooth having substantially steep radially extending leading and trailing edges and adapted to project into and substantially beyond a perforation of the filmstrip during wind and rewind of the filmstrip.*

*46. The camera of claims 4 or 32 for a dispenser having a dispensing spool to which the end of a filmstrip is attached, and further including film tension responsive means responsive to an end-of-film tension condition in said filmstrip for de-energizing said motor means from a film-advancing condition.*

*47. The camera of claims 23 and 24 further including movable film engaging means for engaging a portion of said filmstrip intermediate said dispenser and said take-up and imparting an advancing movement thereto, said movable film engaging means being coupled to said motor means to be driving thereby initially until said filmstrip is captured by said capturing means, said movable film engaging means advancing said filmstrip at a lower speed than the take-up rate of said take-up spool, said movable film engaging means initially propelling the filmstrip towards said film capturing means when the cartridge is initially loaded into said film compartment with the filmstrip placed into engagement with said movable film engaging means and the shutter release means is operated; and one-way clutch means operable between a freely decoupled condition and an engaged non-slipping condition for automatically decoupling said movable film engaging means from said motor means during rewind and in response to the pull on the film upon engagement of a filmstrip perforation by said capturing means as said take-up spool drives the filmstrip at a higher speed than said motor means drives said movable film engaging means, said movable film engaging means thereafter during film advance remaining freely decoupled.*

*48. The camera of claim 24 wherein said motor means is positively coupled to drive said take-up spool in a film-advancing direction without slippage or disconnection therebetween.*

*49. The camera of claim 47 further including film metering switch means responsive to the movement of said film engaging means for turning off power to said motor means after each one-frame advance of said filmstrip; and shutter cocking means coupled to said film advancing means and driven sychronously therewith during film advance for re-cocking the shutter of said camera attendant to a one-frame advance of said film-engaging means.*

*50. The camera of claims 23 or 24 further including movable film engaging means for engaging a portion of said filmstrip intermediate said dispenser and said takeup spool, said movable film engaging means being coupled to said motor means to be driven thereby at a lower speed than the take-up rate of said take-up spool; one-way clutch means operable between a freely decoupled condition and an engaged non-slipping condition for automatically decoupling said movable film engaging means from said motor means when said take-up spool drives the filmstrip at a higher speed than said motor means drives said movable film engaging means; film metering switch means responsive to the movement of said film engaging means for turning off power to said motor means after each one-frame advance of said filmstrip; and shutter cocking means coupled to said film advancing means and driven synchronously therewith during film advance for recocking the shutter of said camera attendant to a one-frame advance of said film-engaging means.*

*51. In an autoloading camera for utilizing a* 35 mm type cassette film dispenser including a cassette housing containing a film strip having edge perforations and a film leader extending from the cassette housing, said camera having a compartment covered by a door, a film-*accepting region in said compartment on one side of an imaging station therein, a take-up spool in another part of said compartment on the other side of said imaging station, motor means for driving said take-up spool; a film engaging rotary sprocket means disposed in advance of said take-up spool to engage said perforations during the film movement, film capturing means on said take-up spool for engaging and capturing said film when said take-up spool is rotated in a film advancing direction with said film thereagainst; and transmission means for coupling said energized motor means to said take-up spool and to said sprocket means to propel said film towards said capturing means on said take-up spool when the leader on the filmstrip is placed over said drive sprocket means; the improvement wherein there is provided repeatedly manually operable control means and means responsive to each operation of said control means for actuating said motor means in a film-advancing direction through a rotation corresponding to the advancement of one film frame responsively to each operation thereof whereby the initial film advancement operation is repeatable if film capture is not achieved upon first operation thereof, and said motor actuating means is non-responsive to closure of said door so that said closure does not cause a film advancing operation.*

*52. The camera of claims 4, 23 or 33 wherein said film capturing means comprises at least one hook on said take-up spool and disposed to engage one of said film perforations when said take-up spool rotates in an advancing direction at an edge speed in excess of film travel speed, and wherein said take-up spool is configured and disposed to position said at least one hook substantially at the imaging plane of said camera.*

*53. The camera of claim 52 wherein said take-up spool houses said motor means.*

• • • • •